(12) United States Patent
Kochman et al.

(10) Patent No.: US 7,643,439 B2
(45) Date of Patent: Jan. 5, 2010

(54) REDUCING POWER CONSUMPTION IN A RECEIVER

(75) Inventors: Yuval Kochman, Ramat Gan (IL); Moshe Penso, Kfar-Saba (IL)

(73) Assignee: MetaLink Ltd., Yakum (IL)

( * ) Notice: Subject to any disclaimer, the term of this patent is extended or adjusted under 35 U.S.C. 154(b) by 379 days.

(21) Appl. No.: 11/422,909

(22) Filed: Jun. 8, 2006

(65) Prior Publication Data

US 2007/0291672 A1    Dec. 20, 2007

(51) Int. Cl.
    *G08C 17/00*    (2006.01)
(52) U.S. Cl. .................. 370/311; 370/328; 370/338; 455/574; 375/340
(58) Field of Classification Search .......... 370/311, 370/328, 338; 375/340; 455/574
    See application file for complete search history.

(56) References Cited

U.S. PATENT DOCUMENTS

| 6,538,592 | B1 | 3/2003 | Yang et al. ............... 341/155 |
| 6,693,953 | B2 | 2/2004 | Cox et al. ................ 375/141 |
| 6,917,820 | B2 | 7/2005 | Gore et al. ............ 455/562.1 |
| 2006/0025169 | A1* | 2/2006 | Maciocco et al. ......... 455/525 |
| 2007/0064839 | A1* | 3/2007 | Luu ...................... 375/340 |
| 2007/0237104 | A1* | 10/2007 | Alon et al. .............. 370/311 |

* cited by examiner

*Primary Examiner*—Danh C Le
(74) *Attorney, Agent, or Firm*—Martin Fleit; Paul D. Bianco; Fleit Gibbons Gutman Bongini & Bianco PL

(57) ABSTRACT

Method and system for reducing the power consumption in a receiver. A power consumption control module reconfigures the receiver for every packet received by the receiver, by setting the receiver's modules to an optimal mode of operation from a power consumption perspective, based on parameters extracted from each packet header.

6 Claims, 3 Drawing Sheets

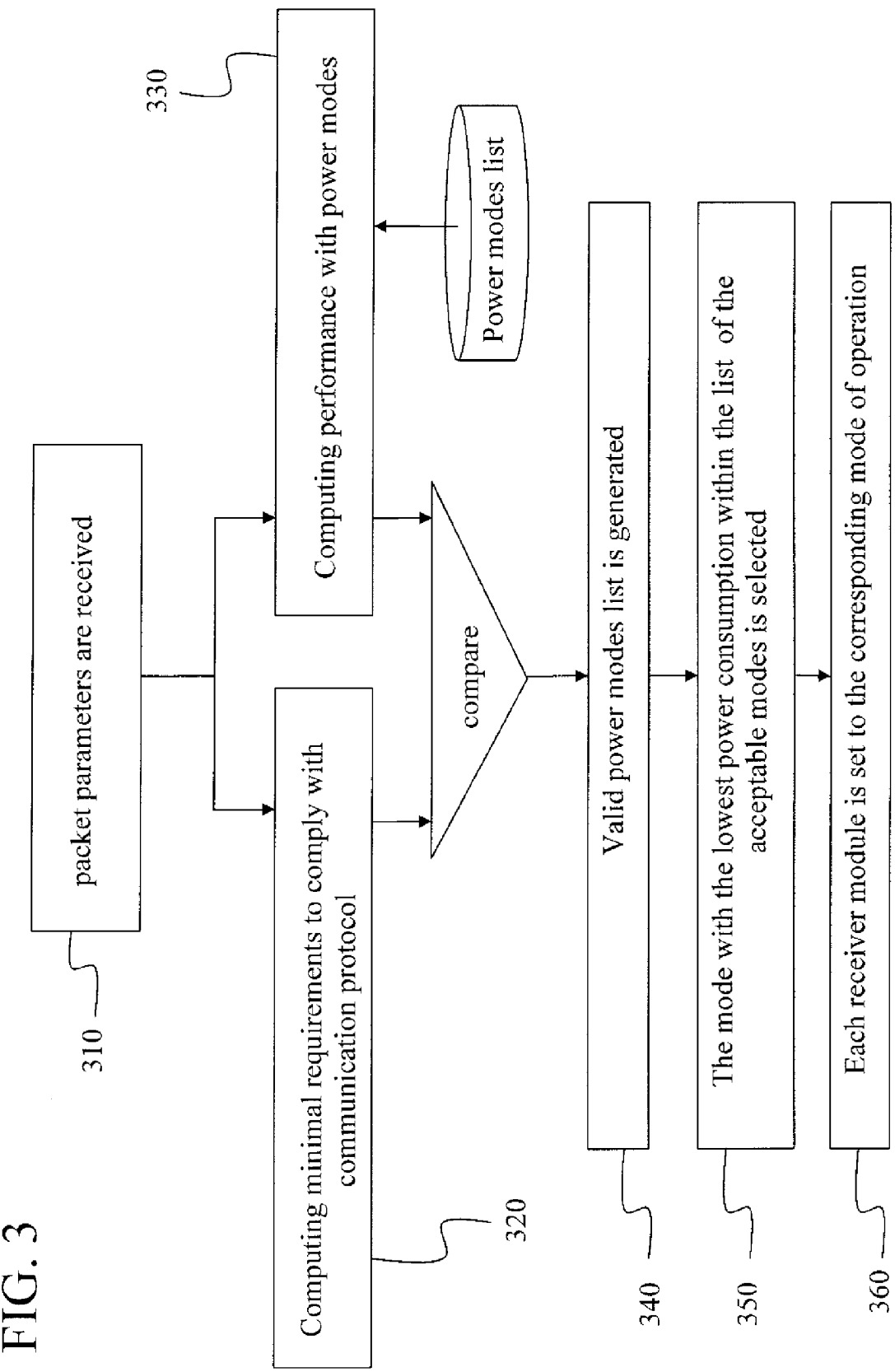

REDUCING POWER CONSUMPTION IN A RECEIVER

FIELD OF THE INVENTION

The present invention relates to a method and/or architecture for receivers generally and, more particularly, to a method and/or architecture for reducing power consumption in receivers.

BACKGROUND OF THE INVENTION

Reducing power consumption is becoming a critical issue in designing mobile devices such as computers and telephone handsets. The issue of low power consumption design relates among other things to Wireless Local Area Networks (WLANs) as many of the network's nodes are placed on mobile stations.

Generally, communication systems are configured so that internal losses in the transmitter and the receiver will enable the system to meet required performance. In particular, in a packet based system, such as the IEEE 802.11x family, the transmitter sets its modes (including power, constellation, coding rate, number of transmitting antennas) according to some sort of channel estimation based on previous packets sent through the network. The above-mentioned modes' setting is performed without an actual knowledge of the present channel conditions (such as fading). As a result, in order to ensure high probability of correct decoding of the packet, the transmitted signal parameters are typically designed for channel conditions much worse than the average expected channel conditions.

Consequently, for most packets the loss inflicted by the noise will be smaller than the noise assumed in design and so decoding will be conducted with significant margins so that the implementation losses in the receiver may be raised without significantly affecting total performance.

Similarly, different features of the receiver are designed to deal with factors such as out of signal-band noise, or high coupling between channels in a MIMO system. When these factors are not substantial, these receiver features may be taken off or used with reduced functionality or performance.

The result deriving from the above-mentioned conditions and constraints is that power management in wireless receivers is not efficient enough and a substantial amount of power may be saved for most of the received packets. The main problem is, that since the receiver has to be designed for low packet error rate, it almost always meets the worst-case scenario.

In some networks, particularly in wireless ones, the deviation in requirements for different packets is very large. Consequently, the average power consumption can be much lower than the worst-case one, and the potential in reducing the average power consumption is therefore substantial.

Several attempts have been made so far in order to deal with the above-mentioned power consumption challenge.

U.S. Pat. No. 6,693,953 teaches a method for reducing power consumption in a receiver based on reducing the power consumption in one of the receiver's modules, the analog to digital converter (ADC). Particularly, the ADC is configured to operate in a lower bit precision whenever the signal is of generally high quality.

U.S. Pat. No. 6,538,592 suggests an ADC having a multi stage structure, wherein some of the stages are not always activated and so power consumption is reduced.

U.S. Pat. No. 6,917,820 teaches a method for configuring the antenna sets of a receiver and a transmitter in a manner that reduces power consumption. In particular, by choosing a set of both transmission and receiving antennas from a larger number of existing antennas, power may be saved.

SUMMARY OF THE INVENTION

Whereas U.S. Pat. No. 6,693,953, U.S. Pat. No. 6,538,592 and U.S. Pat. No. 6,917,820 are limited to only one module of the receiver, the present invention supplies a comprehensive solution for dealing with the power consumption issue as a whole. Furthermore, as opposed to the above-mentioned references, the present invention discloses the mechanism for deriving the corresponding modes of operation from parameters extracted from incoming packets.

The present invention discloses a method and system for reducing the power consumption in a receiver. The present invention suggests a dynamic approach to reducing power consumption in the receiver by reconfiguring the receiver modules for every packet received based on parameters received from the corresponding header of each packet.

The present invention introduces a power consumption control module to the receiver. For each packet received by the receiver, the power consumption control module sets the receiver to the optimal configuration from a power consumption perspective. This is done by setting each sub module of the receiver to the optimal mode of operation based on parameters extracted and estimated from each packet header by the power consumption control module.

In particular, the method for reducing power consumption in a receiver comprises the following steps: In step one, parameters relating to a packet are received. Subsequently, the modes of operations corresponding to said parameters are determined. And finally, at least one receiver module is configured according to said parameters.

BRIEF DESCRIPTION OF DRAWINGS

Further features of the present invention, as well as the structure and operation of various embodiments of the present invention, are described in details below with reference to the accompanying drawings:

FIG. 3 is flowchart showing the operation of the invention.

DETAILED DESCRIPTION OF THE INVENTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

The present invention discloses a method and system for reducing the power consumption in a receiver. In particular, the invention introduces a power consumption control module to the receiver. For each packet received by the receiver, the power consumption control module sets the receiver to the optimal configuration from a power consumption perspective. This is done by setting each module of the receiver to the optimal mode of operation based on parameters extracted and estimated from each packet header by the power consumption control module.

According to one aspect of the invention a power consumption control is performed ad hoc for each packet received.

According to another aspect of the invention, the power consumption control is performed by a dedicated controller that gathers the parameters from the packet header, analyzes the optimal configuration and sets each receiver module to the mode of operation in which the receiver as a whole will consume less power, while maintaining required performance.

Figure 1:
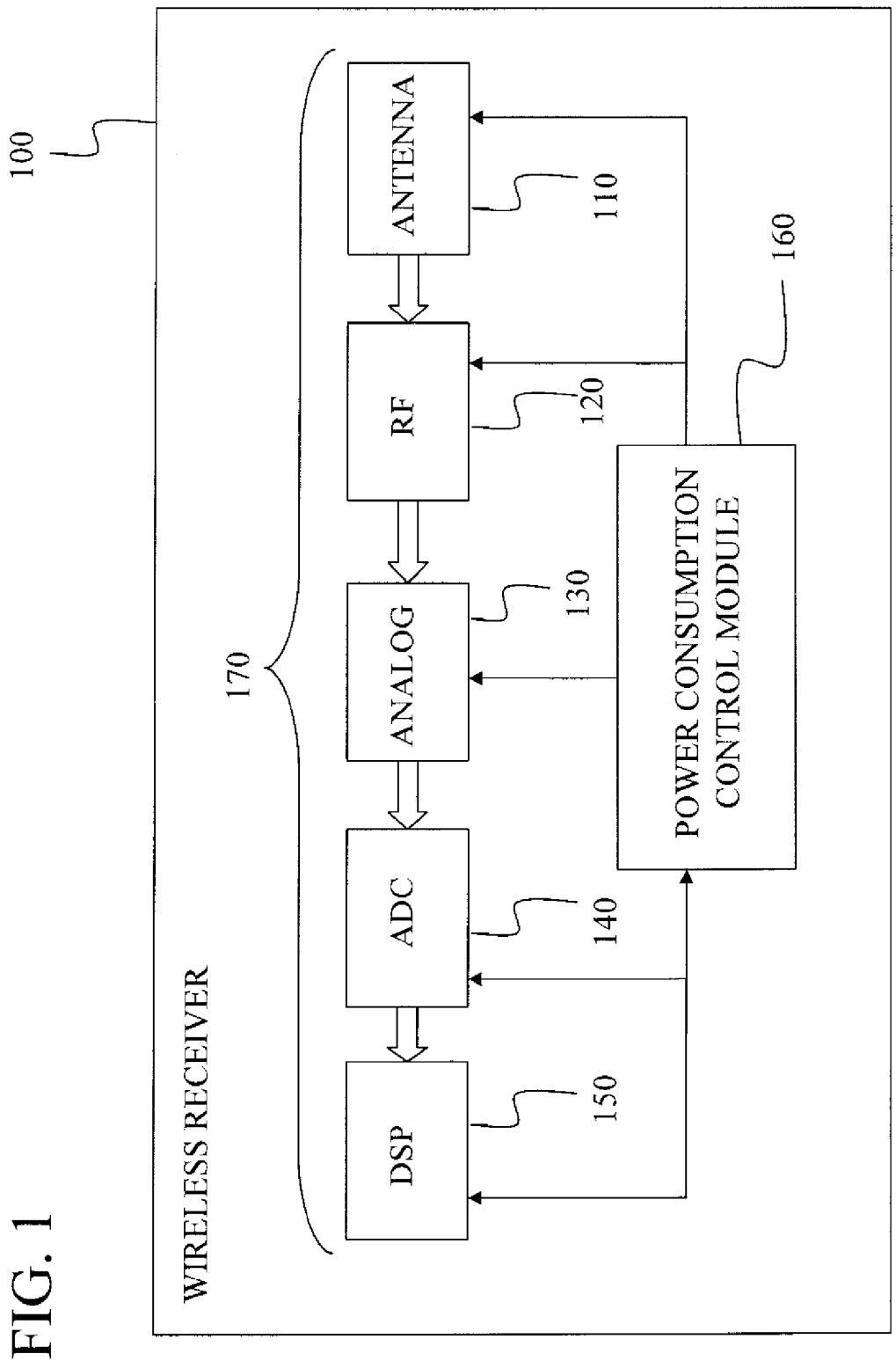
FIG. 1 is a block diagram showing the architecture of the invention.

Referring to FIG. 1, a block diagram of wireless LAN receiver 100 (hereinafter: "the receiver") is shown in accordance with one embodiment of the present invention. The receiver 100 generally comprises receiver modules 170, specifically: at least one antenna 110, at least one Radio Frequency (RF) module 120, at least one analog processing unit 130, at least one Analog to Digital Converter (ADC) module 140, a Digital Signal Processing (DSP) module 150 and a power consumption control module 160.

The power consumption control module 160 is connected to the DSP unit 150 with a bidirectional wiring and with control wires to each of the other modules of the receiver: ADC(s) 140, Analog Processing module 130, RF module 120 and antenna(s) 110.

At least one receiver module 170 has more than one mode of operation, each mode having different power consumption levels, whereas at the maximal power consumption level the receiver module 170 is designed to meet the most severe system requirements. The power consumption control module 160 receives data from the DSP module 150, which allows it to estimate which receiver module 170 can use reduced power, without substantially increasing the frame error rate. Subsequently the power consumption control module 160 sets the modes of all configurable receiver modules 170.

Figure 2:
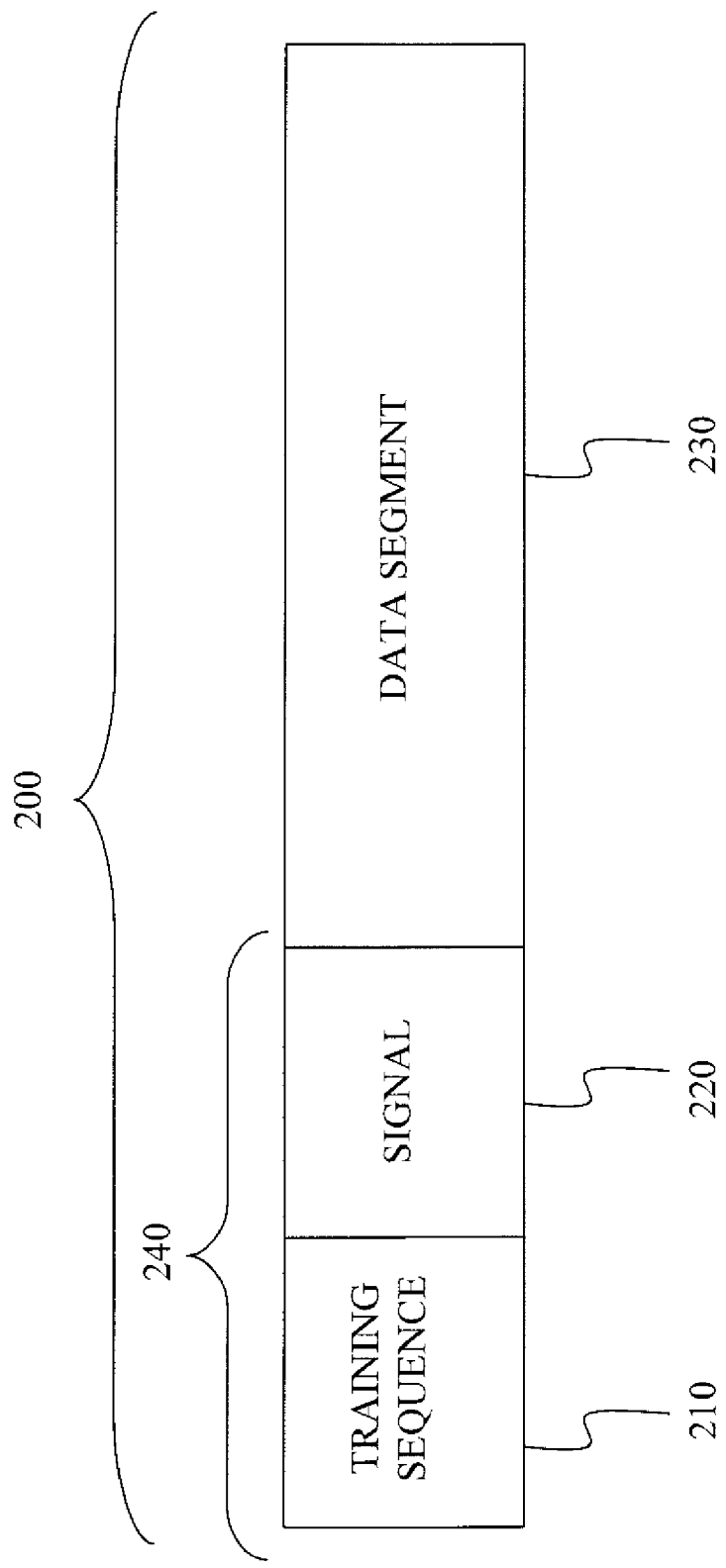
FIG. 2 is a diagram showing the structure of a typical wireless packet.

Referring now to FIG. 2, a schematic diagram shows the structure of a typical wireless packet 200. The wireless packet 200 comprises of a training sequence 210, a signal 220 and data segment 230.

The header 240 starts with some training sequence 210, which is a transmit signal that is known to receiver in advance, used in the receiver for estimating different aspects of the channel and of the received signal.

The signal 220 is where the transmitter conveys parameters of the packet such as duration, constellation, coding used and number of transmit antennas. In different transmission schemes, the structure of the header 210 might be different, for example having multiple "training sequence" 210 and/or "signal" 220 periods in any order—as long as the receiver 100 is able to extract the parameters of the transmitted signal and the channel, necessary for achieving the expected performance.

These parameters, or a part of them, are then passed to the power consumption control module 160 via the DSP module 150.

According to one embodiment of the invention, the header may be distributed throughout the packet and not necessarily concentrated in the beginning of the packet. In such cases, the parameters will he extracted and/or estimated as they appear, resulting in the process described below, performed more than one time for each packet.

Referring now to FIG. 3, a flowchart showing a possible mode of operation of the power consumption control module 160 is depicted.

In the first step, packet parameters are received 310, then a predefined function (for example, a lookup table), computes the minimal requirements to comply with the communication protocol for the received signal 220 parameters (mainly constellation and coding used) 320. In the meantime, another function uses these parameters and a list of all possible modes of the system (combinations of modes of modules), to estimate the receiver performance for each mode 330. Subsequently, the necessary performance and the estimated performance for each mode are compared, to form a list determining all valid modes, or modes for which the receiver can meet expected performance 340. Then, out of these modes, a mode is selected 350 (typically this mode will be the one with the lowest power consumption within the acceptable modes), and finally, corresponding mode commands are given to the different receiver modules 170, 360.

In one example for an embodiment of the present invention, the power consumption of the RF module 120 and the Analog processing module 130 may be reduced by lowering the bias currents of the differential amplifiers (used for adjusting signal level or a part of active filters). This will cause a decrease in the linear dynamic range of the amplifier, and also increase noise thus such a reduction will more likely be implemented when the total received signal is low (no out-of-band interference), and the required SNR is not high.

In another example for an embodiment of the present invention, if the receiver has multiple antennas 110, then some of these antennas 110 may be shut down, together with the associated RF and analog modules. For any given number of antennas to be used, there are already existing methods to choose the subset of antennas that will be used. According to an embodiment of the present invention, the number of antennas to be used may be chosen dynamically.

In yet another example for an embodiment of the present invention, in the ADC module, bias current may be lowered as well.

In yet another example for an embodiment of the present invention, in the digital part of the system, (e.g. DSP module 150) power may be saved by disabling least significant bits, or by other solutions tailored for the specific implementation. In addition, some functions can be shut down completely, for example tracking channel changes during the packet, or correcting inaccuracies of the analog module. If the receiver includes an error correcting code, it can have a sub-optimal hard decision-based mode. If this code is decoded iteratively, then also a limit on the number of iterations can be inserted.

In yet another embodiment of the present invention, channel tracking activities may be turned off during each packet processing, thus saving the energy required for said channel tracking whenever such activities are irrelevant.

Another embodiment for potential applications of the present invention relates to wireless networks that use multiple input multiple output (MIMO) transmission which is becoming very popular. Specifically this embodiment relates to reducing power consumption in the MIMO slicer module with or without the control unit described in detail above. When trying to perform near-optimal slicing, likelihood metrics (or their approximations) must be computed in relation to possible decisions and then compared. This is a very computational intensive process resulting in very high power consumption. Therefore, in order to reduce power consumption of the said computational process a sub-optimal comprises performing some kind of MIMO channel equalizing followed by a simple slicing. In this manner a sufficient sub-optimal result is achieved while keeping the power consumption low.

Numerous characteristics, advantages and embodiments of the invention have been described in detail in the foregoing description with reference to the accompanying drawings. However, the disclosure is illustrative only and it is to be understood that the invention is not limited to the precise illustrated embodiments. Various changes and modifications may be effected therein by one skilled in the art without departing from the scope or spirit of the invention.

What is claimed is:

1. A method of reducing power consumption in a receiver, said method comprising:
   (a) receiving parameters relating to a packet;
   (b) determining modes of operations corresponding to said parameters; and
   (c) configuring at least one receiver module to a low power consumption mode of operation in accordance with said parameters,
   wherein step (a) further comprises: computing power consumption performance of said receiver for each power mode in accordance with received parameters,
   wherein step (a) further comprises: computing performance necessary to comply with corresponding communication protocol for the received parameters, and
   wherein step (b) further comprises: producing a valid power modes list by comparing computed power consumption performance with computed performance.

2. The method according to claim 1, wherein step (b) further comprises: choosing the valid power mode with the minimal value of power consumption from said list.

3. A system for reducing power consumption in a receiver, said system comprising:
   a plurality of receiver modules; and
   a power consumption control module,
   wherein said power consumption control module is connected to at least one said receiver modules,
   wherein at least one of said plurality of receiver modules has at least two modes of operation,
   wherein said power consumption control module is configured to receive packet parameters and set said plurality of receiver modules to the corresponding mode of operation wherein reduction of power consumption is achieved,
   wherein one of said receiver modules is a digital signal processing (DSP) module,
   wherein said power consumption control module is connected to said DSP module, and
   wherein said power consumption control module is configured to receive packet header parameters from said DSP module and set said plurality of receiver modules and said DSP module to the corresponding mode of operation wherein reduction of power consumption is achieved.

4. A system for reducing power consumption in a receiver, said system comprising:
   a plurality of receiver modules; and
   a power consumption control module,
   wherein said power consumption control module is connected to at least one said receiver modules,
   wherein at least one of said plurality of receiver modules has at least two modes of operation,
   wherein said power consumption control module is configured to receive packet parameters and set said plurality of receiver modules to the corresponding mode of operation wherein reduction of power consumption is achieved,
   wherein said system is configured to operate in a multiple-input-multiple-output (MIMO) transmission,
   wherein at least one receiver module comprises a MIMO slicer, and wherein reduction of power consumption in said MIMO slicer is achieved by setting a mode of operation in which a sub optimal MIMO slicing is performed, and said sub optimal MIMO slicing comprises a MIMO channel equalizing followed by a simple slicing.

5. The system according to claim 3 wherein said reduction of power consumption in said DSP module is achieved by setting a mode of operation which limits computational intensive functionalities for some packet processing sessions.

6. The system according to claim 3 wherein said reduction of power consumption in said DSP module is achieved by setting a mode of operation in which the least significant bits are disabled.

* * * * *